Nov. 16, 1965  W. P. FOX  3,217,634
MULTI-FUNCTION PORTABLE COOKING APPARATUS
Original Filed Jan. 26, 1961  3 Sheets-Sheet 1

Inventor:
William P. Fox,
by Russell, Chittick & Pfund
Attorneys

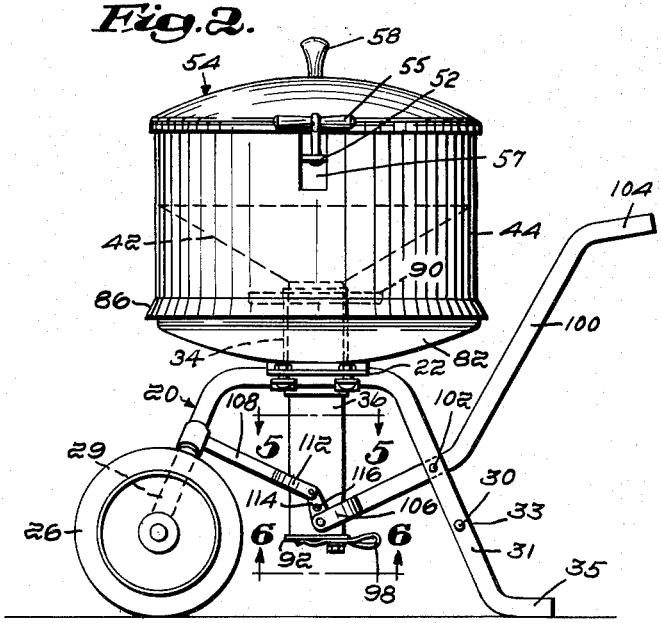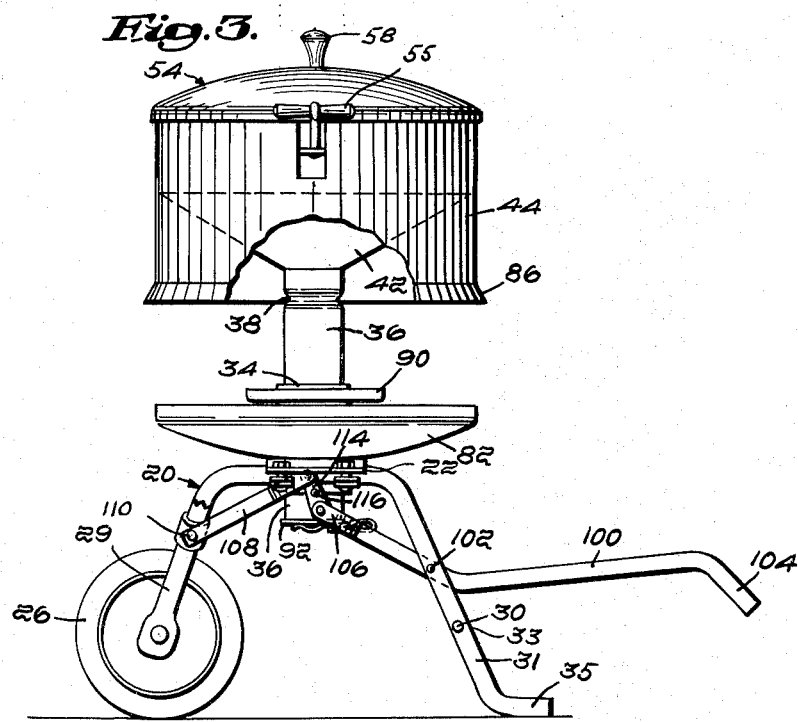

Nov. 16, 1965 W. P. FOX 3,217,634
MULTI-FUNCTION PORTABLE COOKING APPARATUS
Original Filed Jan. 26, 1961 3 Sheets-Sheet 3
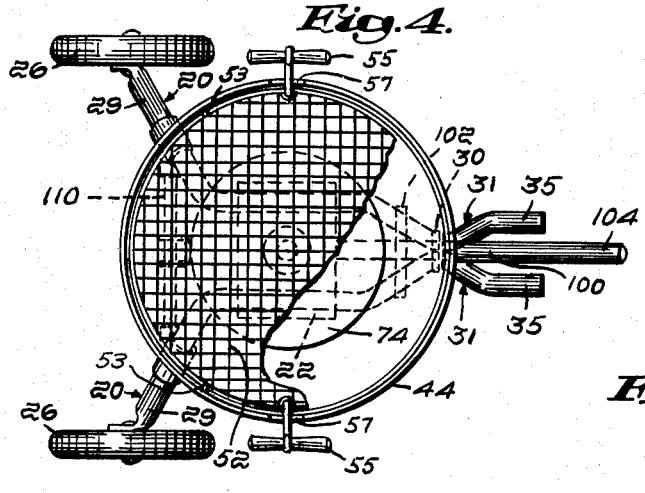
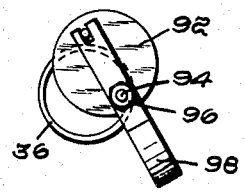
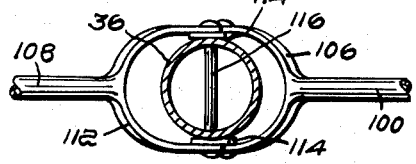
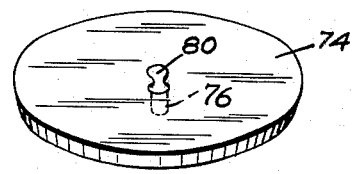
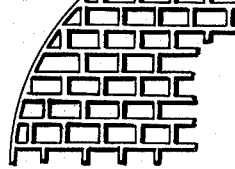
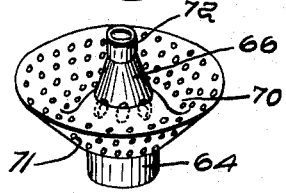
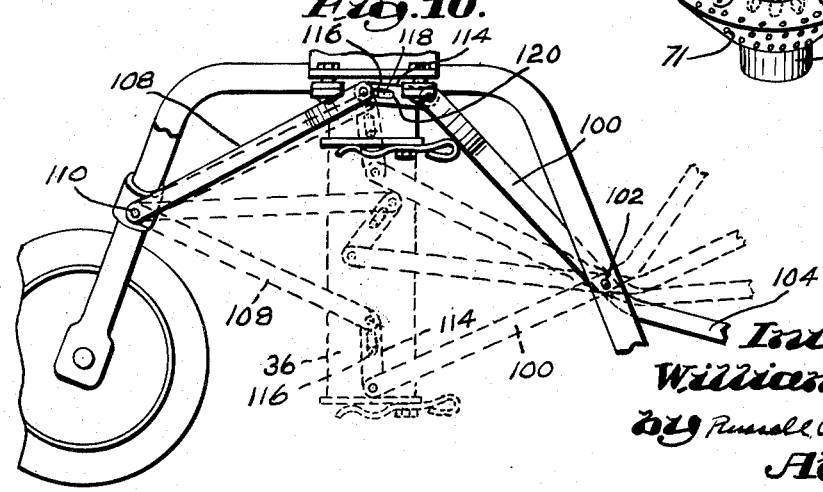
Inventor:
William P. Fox,
by Russell Chittick & Pfund
Attorneys

United States Patent Office 3,217,634
Patented Nov. 16, 1965

3,217,634
MULTI-FUNCTION PORTABLE
COOKING APPARATUS
William P. Fox, Brewster, Mass.
Continuation of abandoned application Ser. No. 85,064, Jan. 26, 1961. This application July 8, 1964, Ser. No. 382,437
11 Claims. (Cl. 99—339)

This application is a continuation of William P. Fox application Serial No. 85,064 filed January 26, 1961, now abandoned.

This invention relates to cooking apparatus and more particularly to portable cooking apparatus suitable for use out-of-doors. The device may be used to perform several different cooking functions; for example, steaming, baking, frying, broiling, roasting, and smoking. These may be simultaneously or individually performed, utilizing but one heat source, preferably using briquets, charcoal or other solid fuel.

The most common portable out-of-doors cooking device is simply a charcoal pit mounted on a base with a grill element disposed above the burning charcoal. There are many modifications of this device, but the basic elements remain the same. The cooking function also remains the same; namely, grilling or roasting over an open fire. This sigularity of function means that at least a part of the cooking for out-of-doors meals must usually be done indoors on a conventional stove. In addition to the limitations in cooking function of charcoal type out-of-doors cooking devices heretofore used, it has generally been impossible to control the charcoal fire with any degree of accuracy.

In carrying out my invention, I provide a fire box above which is means for frying or grilling. Below the fire box is a closed oven area heated indirectly by heat radiated or conducted from the fire box. The oven is opened by moving the fire box and its associated parts, including an oven skirt, upwardly away from the lower part of the oven. This movement is accomplished by manual actuation of a lever which moves upward a centrally located tubular member which serves the dual purpose of supporting the fire box and its related parts when in raised position and acting as a flue for controlling the entrance of air to the burning fuel. Manually operated draft control means is provided in the tubular support. Wheels on the frame enable the unit to be moved readily from place to place.

With the foregoing in mind, it is an object of my invention to provide a portable cooking apparatus which operates by the burning of charcoal or similar solid fuel and which provides simultaneously a plurality of cooking functions, such as grilling, frying and baking.

It is another object of my invention to provide a portable cooking apparatus employing a charcoal type fuel which includes means for controlling the supply of air to said fuel during its combustion.

It is another feature of my invention that I construct two cooking areas, one disposed above the other, with the combustion area positioned in the upper cooking area, yet being supplied from below with fresh air.

It is a further feature of my invention that means are provided for controlling the fire in the combustion area by adjusting the flow of fresh air into the combustion area.

It is yet another feature of my invention that means are provided for receiving a quantity of water in the lower cooking area in such position with respect to the fire that the water will be converted to steam if it is desired to steam foods therein.

These and other objects and features of my invention will appear as the description proceeds with the aid of the accompanying drawings in which:

FIG. 2 is a view in side elevation of my invention in normal operating position;

FIG. 3 is a view in side elevation showing my invention with the upper cooking area and fire box raised, exposing the lower cooking area;

FIG. 4 is a plan view with the cover removed and the grate cut away in part;

FIG. 5 is a cross-sectional view taken on the line 5—5 of FIG. 2;

FIG. 6 is a bottom view taken on the line 6—6 of FIG. 2 showing the draft regulating means;

FIG. 7 is a view in perspective of the drip pan and shield;

FIG. 8 is a fragmentary plan view of the grill or grate element that is used in the upper cooking area;

FIG. 9 is a view in perspective of the draft spreader and means for supporting the drip pan and shield; and FIG. 10 is a fragmentary side view of my invention showing alternative self-locking linkage mechanism.

Figure 1:
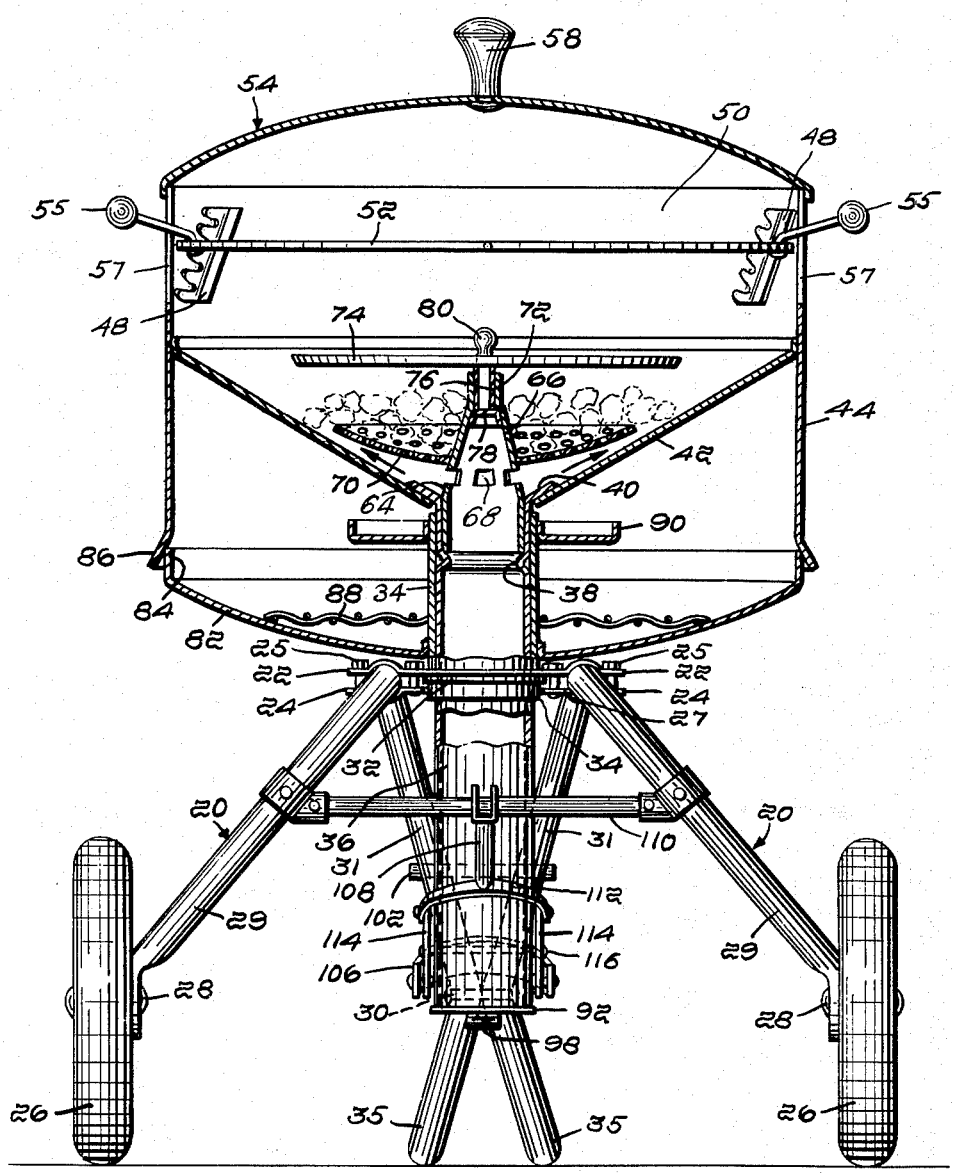
FIG. 1 is a view in cross-section of my invention in operating position.

Having reference to the above described drawings for a more particular description, I mount a pair of symmetrical tubular steel leg members 20 in a rectangular base bracket 22 which is grooved toward either extremity to receive on its under side the leg members 20. Each leg member 20 is held firmly in the grooved base bracket 22 by a cooperating grooved clamping member 24 secured to the base bracket 22 by bolts 25 or other appropriate means.

The leg members 20 are formed with a horizontal intermediate segment 27 to which the bracket 22 is clamped and have downwardly and outwardly extending forward segments 29 which form the front legs of the apparatus. Wheels 26 are rotatably attached to the lower extremity of each front leg segment by an appropriate axle 28.

Rear leg segments 31 are formed by bending the rear segments of the leg members 20 downwardly and inwardly until they meet at a point 33. At this junction point a bolt 30 or other appropriate joining means is used to hold the rear leg segments securely together. The lower portions of the rear leg segments are then bent apart and rearwardly to form foot elements as at 35.

The base bracket 22 is further formed to provide a circular opening through its center defined by a downwardly extending annular flange 32. A hollow cylindrical sleeve member 34 is attached by welding to the downwardly extending annular flange 32 and extends upwardly from the base bracket 22.

A cylindrical hollow draft tube 36 is slidably positioned within the hollow cylindrical sleeve 34. An inwardly extending annular rib 38 is formed in the draft tube 36 near the upper end thereof. The upper portion of the draft tube 36 is formed to provide a short conical flange 40.

A fire pot 42 having the general configuration of an inverted truncated conical segment is attached by welding to the flange element 40.

A fire pot side wall is provided by welding a cylindrical metal sheet 44 to the upturned outer edge 45 of the fire pot 42. The cylindrical wall member 44 serves several purposes in my invention. It provides a side wall disposed around the fire pot 42 and extending vertically upwardly therefrom. It also acts to support three sloping toothed or notched elements 48 spaced 120° apart about the upper interior wall 50, which elements serve to support a grill or grate 52 by means of radially extending pins 53. Elements 48 are shown as containing four teeth or notches so that the grill 52 may be placed at any of four selected vertical positions above the fire pot. To move the grill up or down, a pair of oppositely disposed handles 55 are provided which extend through slots 57 in the upper wall 50. Slots 57 are wide enough to accommodate the required circumferential shift in the positions of the handles as the pins 53 are shifted to different teeth or notches on elements 48. Further, the cylindrical wall member 44 is constructed to receive a cover indicated generally at 54. Cover 54 is a circular concave metal plate having a downwardly extending circumferential flange 56 dimensioned to fit over the outer surface of the upper wall portion 50. A handle 58 is affixed to the top of the cover 54. Slots 57 act as vents when the cover 54 is in position. Additionally, cylindrical wall member 44 provides a shield or cover for the lower cooking area as hereinafter described.

Carried by the slidable draft tube 36 is a draft spreader assembly. This comprises a hollow cylindrical member 64 which is positioned in the upper end of the draft tube, resting on the inwardly extending annular rib 38. A hollow conical element 66 is attached to the top of the cylindrical member 64, and openings 68 are provided whereby air can flow from the draft tube into the fire pot 42. A draft spreader 70 of inverted conical form is attached to the conical element 66 above openings 68. The draft spreader 70 is spaced from the fire pot 42 and is provided with a multiplicity of openings 71 whereby air passing up the draft tube 36 and through openings 68 may reach the burning fuel on the draft spreader 70. The air may also pass outwardly between the draft spreader 70 and the fire pot 42 to reach the fuel located above and beyond the outer edge of the spreader, thereby sustaining even combustion of the fuel.

The uppermost portion of the hollow conical element 66 is provided with a short upwardly extending vertical tubular element 72 which is formed to support the drip pan hereinafter to be described.

In the practice of my invention I have found that although the hollow cylindrical member 64, the hollow conical element 66, the draft spreader 70 and the tubular element 72 may be constructed as separate members and then joined together, it is also feasible and practical to form the several parts as an integral unit by casting, and in the preferred embodiment of my invention this procedure is followed.

A flame shield and drip pan 74 is provided which is positioned over the burning fuel to prevent fats released in cooking on the grill 52, particularly when using the upper area for smoking with the cover 54 in place, from falling into the fire and causing undesirable flareups. Drip pan 74 is formed of an imperforate flat circular element provided with a short downwardly extending cylindrical stem 76 positioned in the center of its under side and dimensioned to be received into the upwardly extending vertical tubular element 72. A stop member 78 may be suitably positioned within the tubular element 72 if it is desired to prevent the drip pan 74 from resting directly on the tubular element 72. A suitable handle 80 is positioned on top of the drip pan 74 whereby it may be more easily removed from the apparatus.

In order to increase the area in which cooking may be carried on and also to multiply the cooking functions which may be performed simultaneously while using the single heat source, a second cooking enclosure is provided positioned below the fire pot 42. A circular base member 82 is mounted on the hollow sleeve 34 and positioned just above the bracket 22. Base 82 is a concave circular member having a radial dimension substantially equal to the fire pot 42. In practice a member identical to that used to form the cover 54 is employed and a suitable hole is cut through its center whereby it may be fitted on the hollow cylindrical sleeve 34. Base 82 is provided with an upwardly extending circumferential flange 84. A cover is provided by extending the cylindrical wall member 44 downwardly and providing an outwardly flared lip 86 which engages the circumferential flange 84 and acts to support fire pot 42 when the apparatus is in closed position, as hereinafter described. The fire pot 42 thusly forms the top of the lower cooking enclosure, the cylindrical wall member 44 the side, and the base 82 the bottom.

A two-piece support rack 88 is removably positioned in the lower cooking enclosure for supporting foods to be cooked or warmed. Rack 88 is made of two semi-circular elements formed to fit around the sleeve 34.

It will now be apparent that foods may be baked or roasted in the lower cooking enclosure or oven using the heat radiated or conducted from the fire in the fire pot 42. As it might frequently be desired to steam foods, as, for example, steamed clams, I provide an annular tray 90 in the lower oven for containing water which may be converted into steam. The annular water tray 90 surrounds the sleeve 34 and it attached to it towards its upper extremity. By positioning the water tray 90 in the upper portion of the lower oven, the heat radiated downwardly from the fire pot 42 will be more effective to produce steam than would be the case if the water were placed in the bottom of base 82 below rack 88.

It will also be apparent that the principal supply of fresh air necessary for the combustion of the fuel is drawn up to the fire pot 42 through the draft tube 36. It, therefore, is possible to regulate the rate of combustion in the fire pot 42 by increasing or diminishing the flow of air through the draft tube 36. This I accomplisch by providing a draft register at the lower extremity of the draft tube 36. The draft register is formed by mounting a circular plate 92 across the lower end of the draft tube 36. The plate 92 is of sufficient radius to completely cover the entrance to the draft tube 36 and is attached by a bolt 94 and nut 96 in such manner that it may be pivoted to gradually expose the entrance to the draft tube 36. To facilitate opening and closing, a suitable handle 98 is also provided attached to the plate 92 (see FIG. 6).

The draft tube 36 is, as explained above, vertically slidable within the hollow cylindrical sleeve 34. It is necessary that means be provided for moving the draft tube 36 vertically in order to raise the cylindrical wall member 44 to expose the lower cooking enclosure. FIGS. 2 and 3 show the closed and extreme open positions of the apparatus. To accomplish the movement of the slidable draft tube 36 in a vertical path and to prevent possible binding of the draft tube 36 within the fixed hollow cylindrical sleeve 34, I provide a lever arm 100 pivotally mounted between the rear leg segments of the legs 20 on a transverse pivot bolt 102. The outer extremity of the lever arm 100 is formed to provide a suitable handle 104 whereby the apparatus may be pushed from place to place and whereby the slidable draft tube 36 may also be raised by depressing the handle 104. The inner extremity of the lever arm 100 is formed to provide a yoke element 106 (see FIG. 5) which is dimensioned to extend halfway around the slidable draft tube 36. A second lever arm 108 is pivotally mounted to a transverse support bar 110 which is fastened between the two front leg segments of the legs 20. The second lever arm 108 terminates at its inner end in a yoke element 112 which is also positioned to extend halfway around the draft tube 36. The lever arm 100 and the lever arm 108 are each pivotally connected to the opposite ends of rocker arms 114 which are pivotally positioned on opposite sides of the slidable draft tube 36 on a transverse pivot rod 116 which passes through the slidable draft tube 36. The lever arms 100 and 108 and the rocker arms 114 are all positioned relative to the slidable draft tube 36 so that a linkage mechanism is provided whereby the slidable draft tube 36 may be moved in a vertical path within the hollow cylindrical sleeve 34, thereby lifting the fire pot 42, cylindrical wall member 44 and associated elements to expose the interior of the bottom cooking area.

If it is desired to provide a self-locking feature whereby the upper cooking area and associated fire pot 42 may be locked in raised position, the rocker arms 114 may be constructed according to an alternative construction illustrated in FIG. 10. The only change from the rocker arm 114 as explained above consists in providing an elongated longitudinal slot 118 through each arm 114. The slot 118 is positioned such that in all positions of the draft tube 36 and the associated transverse pivot rod 116, except that of extreme upward travel, the rod 116 will be engaged by a lower end 120 of the slot 118, which lower end is located at substantially the midpoint of the arm 114. When the rod 116 has been raised to its highest desired point, the arm 114 rotates counterclockwise, as viewed in FIG. 10, from its normal generally vertical position, simultaneously shifting to the right with respect to rod 116, thereby locking the upper cooking area in raispositioned. This locking results because the draft tube 36 and rod 116 are constrained to move only in a vertical path and because the lever arm 100 is pivoted at a point lower than the lever arm 108. By providing the slot 118, the arm 114 is enabled to move to the right with respect to the rod 116 and assumes a position approximating horizontal when the rod 116 is against the other end of slot 118. The slot 118 must be carefully calculated a sto length so that the arm 114 does not travel so far to the right that the arm 108 falls below the arm 100. To release the draft tube 36, etc., it is only necessary to lift up on the handle 104 which causes the lever arm 100 to move back toward the line of vertical movement of the rod 116 and hence push the arm 114 back to its original generally vertical position, whereupon the upper cooking area may be lowered into operating position.

The operation of my out-of-doors cooker is as follows: The fuel, charcoal briquets, for example, is placed in the fire pot 42 above the draft spreader 70 and is ignited. The drip pan 74 is positioned above the fire and the grill 52 is put in place. In order to feed air to the fire through draft tube 36, the draft register plate 92 must be opened. Proper adjustment of the draft register plate 92 will control the rate of combustion in the fire pot 42. The cooker is then ready for operation.

It will now be obvious to one skilled in the art that several different cooking functions may be simultaneously performed. For example, a steak or other meat can be grilled or barbecued on the grill 52 above the fire pot. At the same time, other foods, for example, potatoes, a casserole or a cake, may be baked in the lower cooking enclosure or oven. It is thus to be noted that an entire meal may be prepared in my out-of-doors cooker.

Cooking functions other than those above described may also be performed. For example, water may be placed in the annular water tray 90 whereby the lower cooking enclosure may be utilized as a steamer rather than a dry oven. The grill 52 above the fire pot 42 may be removed and the drip pan 74 may be used as a frying surface is desired. One other cooking function may be performed in my cooker, namely, smoking. When a proper fire has been kindled in the fire pot 42, the food to be smoked is placed on the grill 52 and the cover 54 is put in place. The smoke is thusly confined, and the fire controlled to produce conditions for smoking.

A further possible use for my cooker is as a space heater in any enclosed area. The cover 54 may be put in place to prevent the heat from being drawn upwardly in too great quantities.

It will also be observed that my cooker is extremely easy to clean. Removal of the ashes from the fire pot 42 is accomplished by fully opening the draft register plate 92 and by removing the draft spreader assembly. In the preferred embodiment, the hollow cylindrical member 64, conical element 66 and spreader 70 are of unitary construction, and hence drawing the conical element 66 upwardly and out of the draft tube 36 removes the whole draft spreader assembly. The draft tube 36 is then wholly open and provides an opening for the ashes to drop out of the fire pot 42. An outlet having a cock (not shown) may also be positioned through the base 82 of the lower cooking enclosure whereby accumulated fluids may be drained therefrom.

It is my intention to claim all changes and modifications of the examples of the invention herein chosen for purposes of disclosure which do not constitute departures from the spirit and scope of my invention.

I claim:

1. Portable cooking apparatus comprising a base, wheels attached to said base for moving said base, first means comprising a lower cooking area in the form of a pan mounted on said base, said pan surrounding a vertical draft tube slidably mounted therein, second means comprising an upper cooking area directly above said lower cooking area in the form of a dished element forming a fire pot mounted on said draft tube and above said pan, a draft spreader positioned within said fire pot and mounted above the upper end of said draft tube, lid means for said lower cooking area comprising said dished element and a wall depending therefrom and fixed with respect to said draft tube, support means in said upper cooking area for supporting foods to be cooked therein, and means for moving said slidable draft tube in vertical relation to said base and said lower cooking area whereby said lid means for said lower cooking area may be raised to expose the interior of said lower cooking area.

2. Portable cooking apparatus as defined in claim 1 further characterized by means contained in said upper cooking area in the form of a baffle removably positioned above said draft tube and draft spreader.

3. Portable cooking apparatus comprising a base, a central draft tube vertically and movably mounted on said base, upper cooking means supported on said draft tube and including a fire pot, a draft spreader in the said fire pot and over said draft tube, lower cooking means surrounding said draft tube and fixed to said base, means for moving said draft tube and associated upper cooking means up and down with respect to said base and said lower cooking means, circumferential shield means for enclosing said lower cooking means attached to said upper cooking means and movable therewith, an open water container attached to said draft tube in said lower cooking means, and means including wheels and a handle attached to said base for moving said apparatus.

4. Portable cooking apparatus as defined in claim 1, said means for moving said draft tube and associated elements in vertical relation to said base and lower cooking area comprising a first lever arm pivotally attached to said base and extending at one end outwardly thereof to form handle means and extending inwardly thereof toward its other end, a second lever arm pivotally attached to said base and extending inwardly therefrom, and a third lever arm pivotally attached to said draft tube and to said first and second lever arms at the inner ends thereof, whereby a linkage system for causing said draft tube to move in vertical relation to said base is provided, said first lever arm and associated handle means also serving to provide means for manually moving said portable cooking apparatus.

5. Portable cooking apparatus comprising a base, wheels attached to said base for moving said base, first means comprising a lower cooking area in the form of a pan mounted on said base, said pan surrounding a vertical draft tube slidably mounted through said pan, second means comprising an upper cooking area directly above said lower cooking area and having a conical element forming a fire pot mounted on said draft tube and above said pan, a removable draft spreader positioned wholly within said fire pot and mounted on the upper end of said draft tube, a removable lid on said upper cooking area, lid means for said lower cooking area comprising said conical element and a wall depending therefrom fixed with respect to said draft tube, support means in said upper cooking area for supporting foods to be cooked therein, and means for moving said slidable draft tube in vertical relation to said base and said lower cooking area whereby said lid means for said lower cooking area may be raised to expose the interior of said lower cooking area.

6. Portable cooking apparatus as defined in claim 5, further characterized by means contained in said upper cooking area in the form of an imperforate circular baffle element removably positioned at the upper end of said draft tube, said last means adapted to perform the triple function of (a) providing a surface suitable for use as a griddle, (b) providing an element for diffusing the heat radiated upwardly from said fire pot and (c) providing means for preventing fats and similar combustibles released by cooking from falling into said fire pot.

7. Portable cooking apparatus as defined in claim 5, further characterized by said support means contained in said upper cooking areas being removable.

8. Portable cooking apparatus comprising a base, a central draft tube vertically mounted on said base, means for moving said draft tube in vertical relation to said base, means comprising an upper cooking means supported on said draft tube and including a fire pot, a draft spreader over the said fire pot removably supported by said draft tube and a removable cover on said upper cooking means, a lower cooking means surrounding said draft tube and fixed to said base, means for sliding said draft tube and associated upper cooking means vertically with respect to said lower cooking means, circumferential shield means for said lower cooking means attached to said upper cooking means, a tray for containing water attached to said draft tube in said lower cooking means, and means including a pair of wheels attached to one side of said base and a handle attached to the other side thereof for moving said apparatus, whereby a portable cooking apparatus is provided having an upper cooking means containing a fire pot and means for broiling, frying, roasting and smoking and a lower cooking means for baking and steaming, said lower cooking means also drawing its heat from said fire pot.

9. Portable cooking apparatus comprising a base mounted on wheels, a cooking pan mounted on said base, a vertical draft tube mounted for vertical movement through said pan, a dished element forming a fire pot mounted on said draft tube above said pan, a wall depending from said fire pot to engage said pan and enclose the space between said fire pot and pan when said draft tube is in lowered position, food supporting means associated with an upward extension of said wall above said fire pot, and means for moving said draft tube, fire pot and wall up and down first to expose the interior of said pan and then to enclose said space, said moving means comprising a first lever arm pivotally attached to said base and extending at one end outwardly thereof to form handle means and extending inwardly thereof toward its other end, a second lever arm pivotally attached to said base and extending inwardly therefrom, and a third lever arm pivotally attached to said draft tube and to said first and second lever arms at the inner ends thereof, whereby a linkage system for causing said draft tube to move in vertical relation to said base is provided, said first lever arm and associated handle means also serving to provide means for manually moving said portable cooking apparatus.

10. Portable cooking apparatus comprising a fire pot in the form of a dished element, supporting means for said dished element, an opening at the bottom of said dished element, a vertical draft tube depending from said dished element and connecting with said opening, and a draft spreader of substantially greater area than said opening but less than the area of said fire pot and mounted above said draft tube within and spaced vertically from said dished element a sufficiently small distance to prevent fuel from passing downwardly therebetween, said draft spreader being perforated and acting to support fuel thereon and to permit access to said fuel of air moving upwardly through said draft tube and opening.

11. Portable cooking apparatus as set forth in claim 10, said draft spreader being removable from said fire pot to expose the open upper end of said draft tube, whereby ashes or other material in said fire pot may be discharged therefrom downwardly through said draft tube.

References Cited by the Examiner
UNITED STATES PATENTS

| | | | |
|---|---|---|---|
| 1,069,802 | 8/1913 | Mokry. | |
| 1,702,518 | 2/1929 | Morley | 126—41 |
| 2,487,605 | 11/1944 | Smith | 99—339 X |
| 2,894,448 | 7/1959 | Henderson et al. | 99—444 |
| 2,915,001 | 12/1959 | Montgomery | 99—339 |
| 2,923,229 | 2/1960 | Halford | 99—339 |
| 2,943,557 | 7/1960 | Svehlsen | 99—446 X |
| 2,949,525 | 8/1960 | Dunn | 99—339 X |

CHARLES A. WILLMUTH, *Primary Examiner.*

ROBERT E. PULFREY, *Examiner.*